Oct. 24, 1933.    L. J. STOCKS    1,932,052
MACHINE FOR INSERTING ARTICLES IN ENVELOPES
Filed Oct. 24, 1932    7 Sheets-Sheet 2

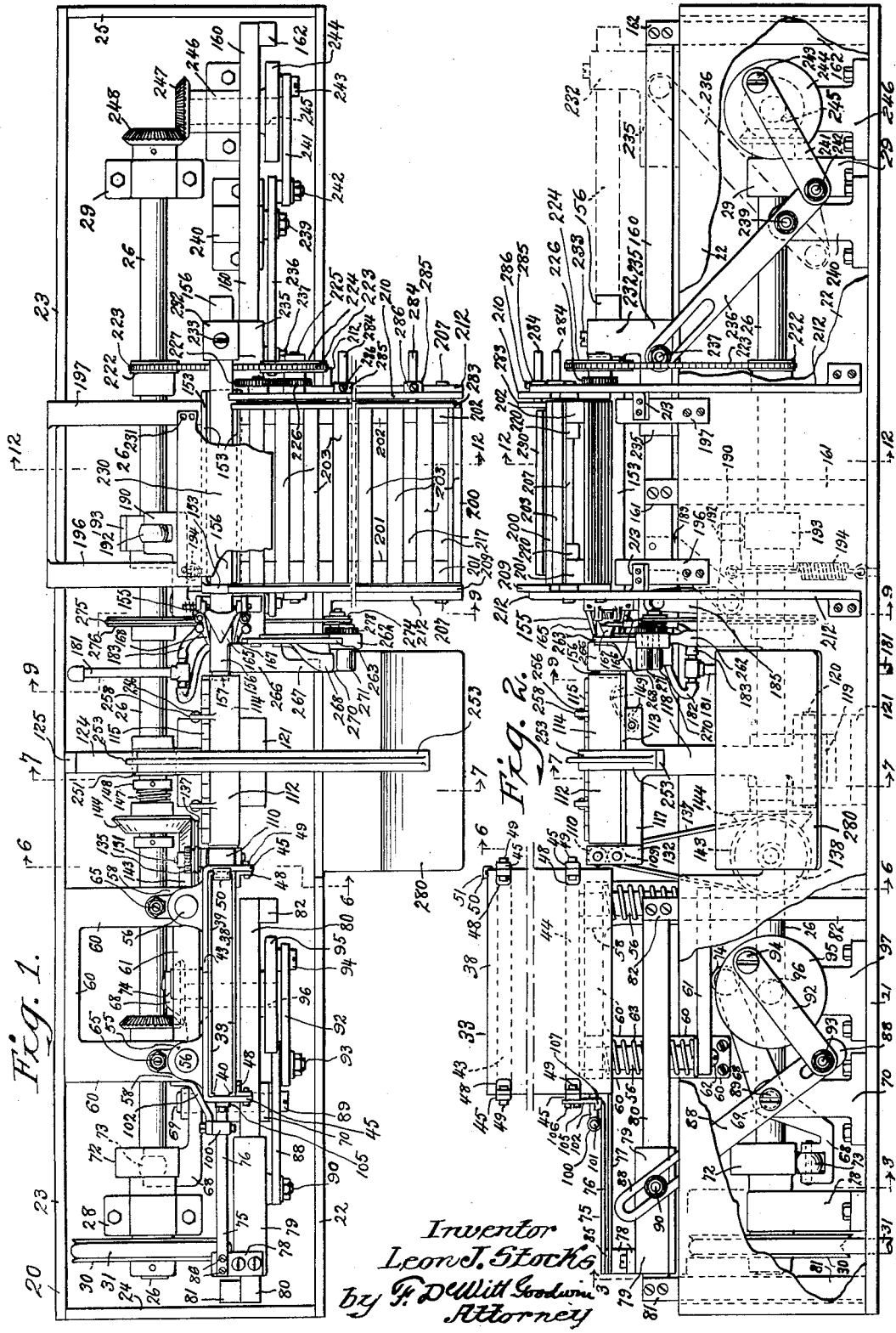

Inventor
Leon J. Stocks
by G. DeWitt Goodwin
Attorney.

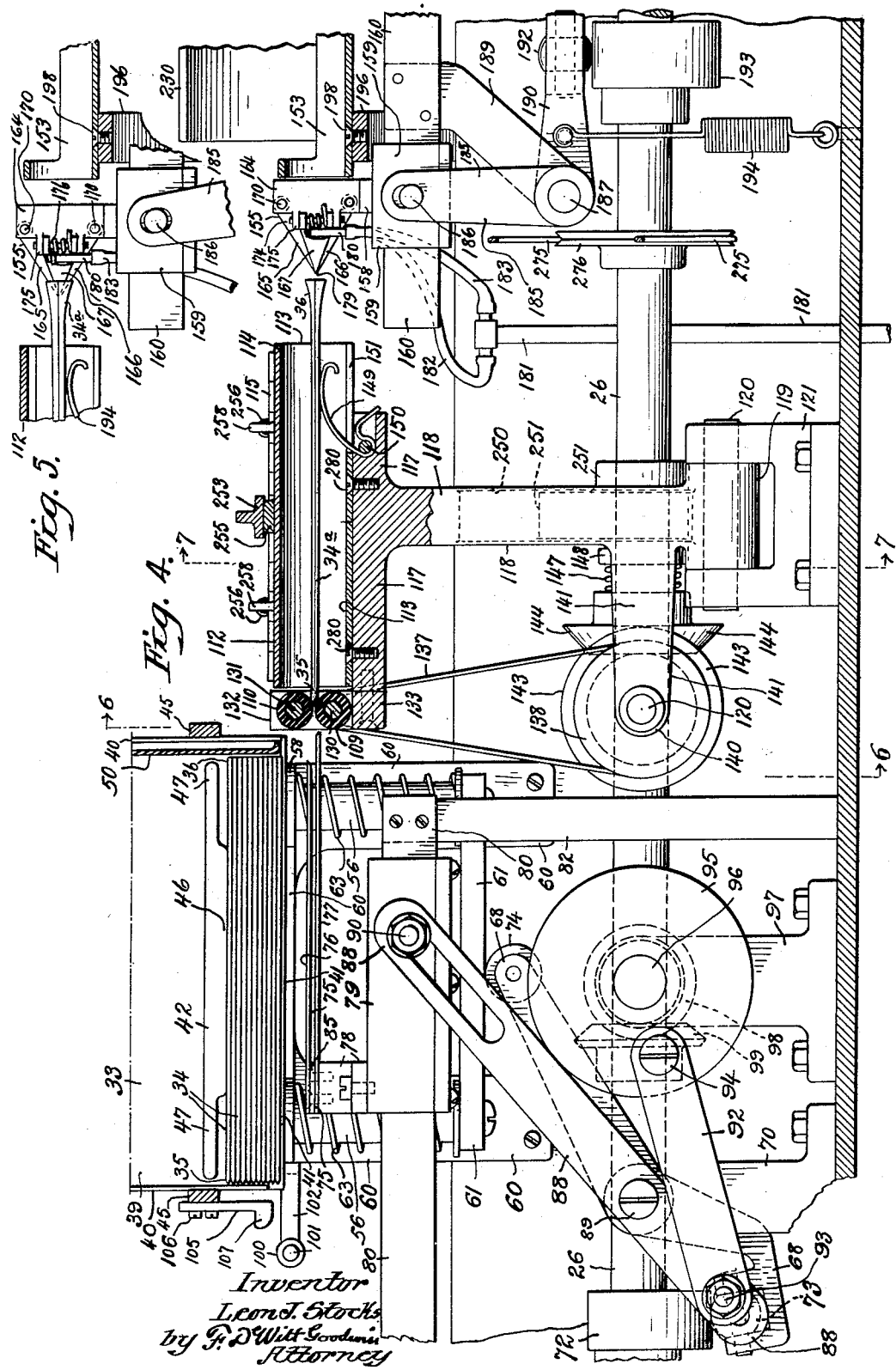

Oct. 24, 1933.    L. J. STOCKS    1,932,052
MACHINE FOR INSERTING ARTICLES IN ENVELOPES
Filed Oct. 24, 1932    7 Sheets-Sheet 4
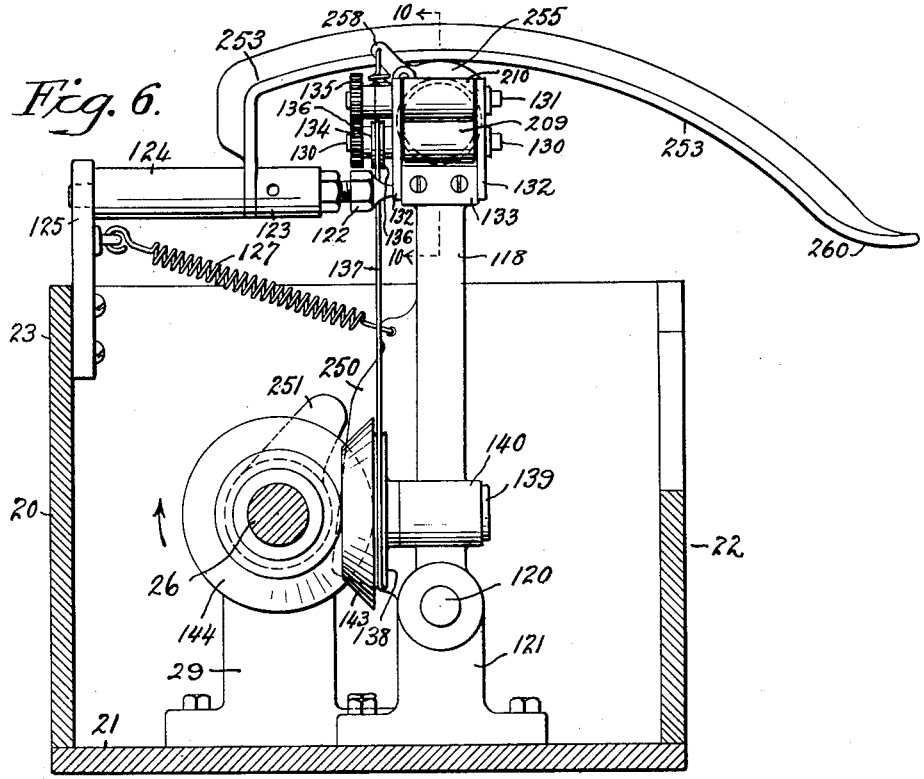
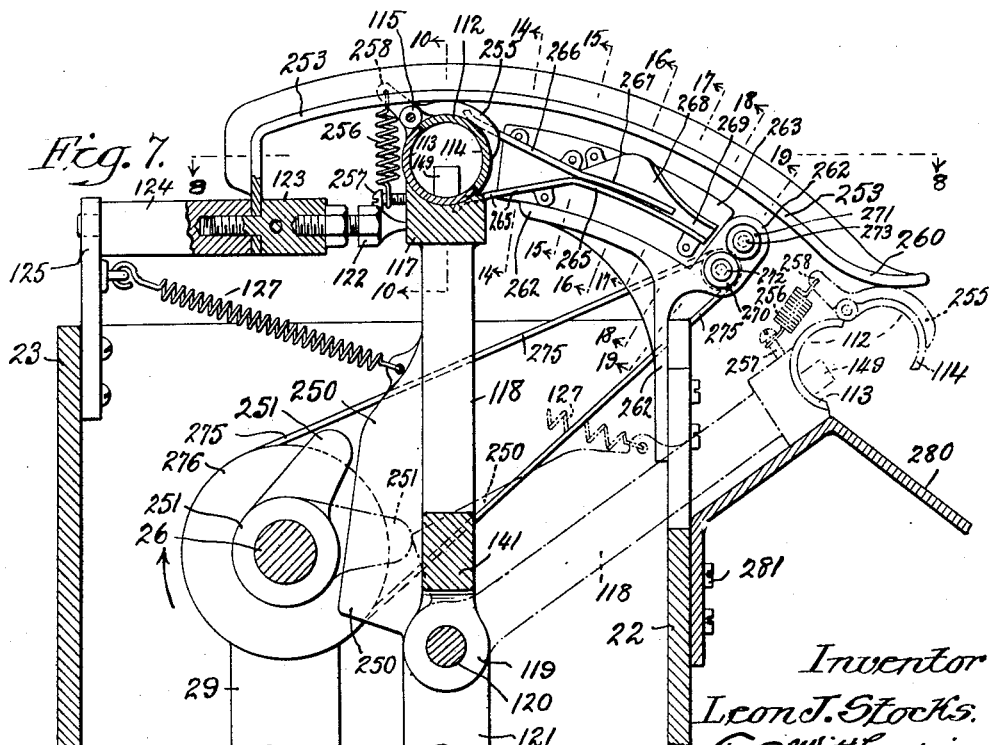
Inventor
Leon J. Stocks.
by G. DeWitt Goodwin
Attorney Oct. 24, 1933.  L. J. STOCKS  1,932,052
MACHINE FOR INSERTING ARTICLES IN ENVELOPES
Filed Oct. 24, 1932  7 Sheets-Sheet 6
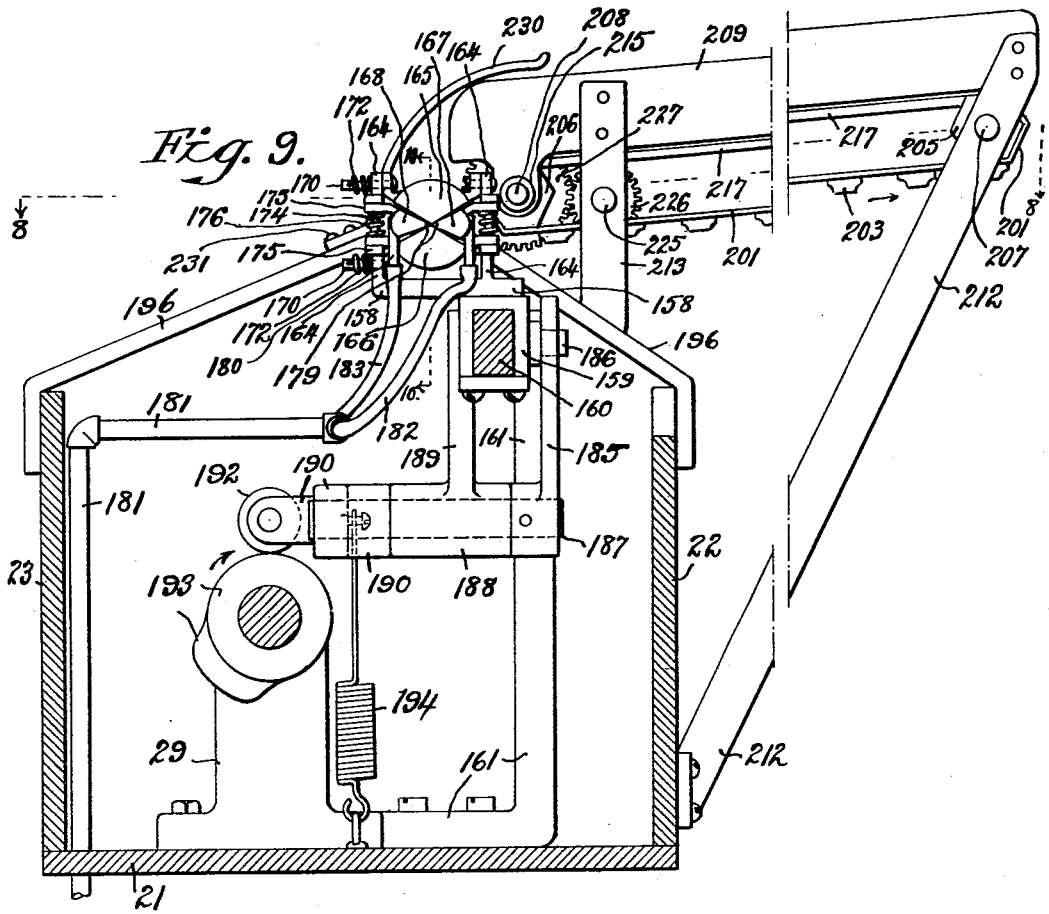
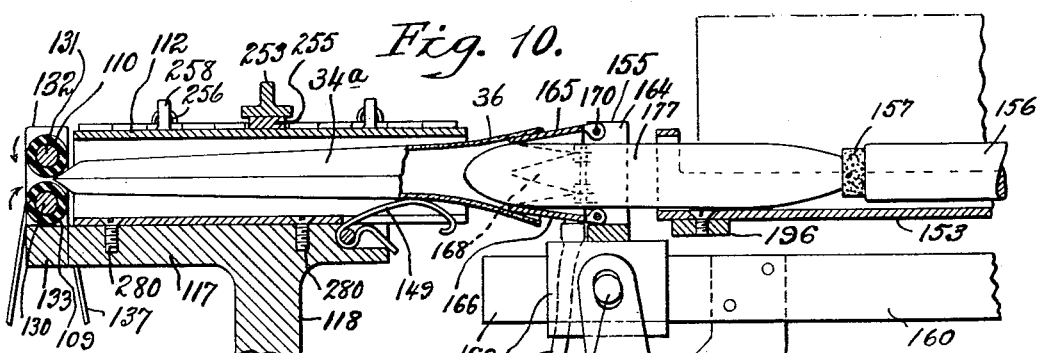
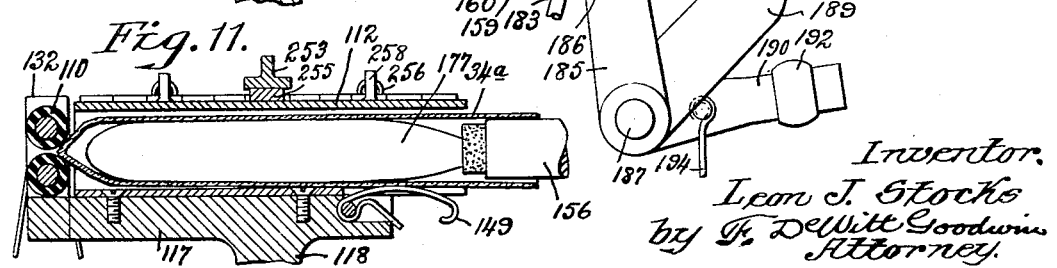
Inventor:
Leon J. Stocks
by F. DeWitt Goodwin
Attorney.

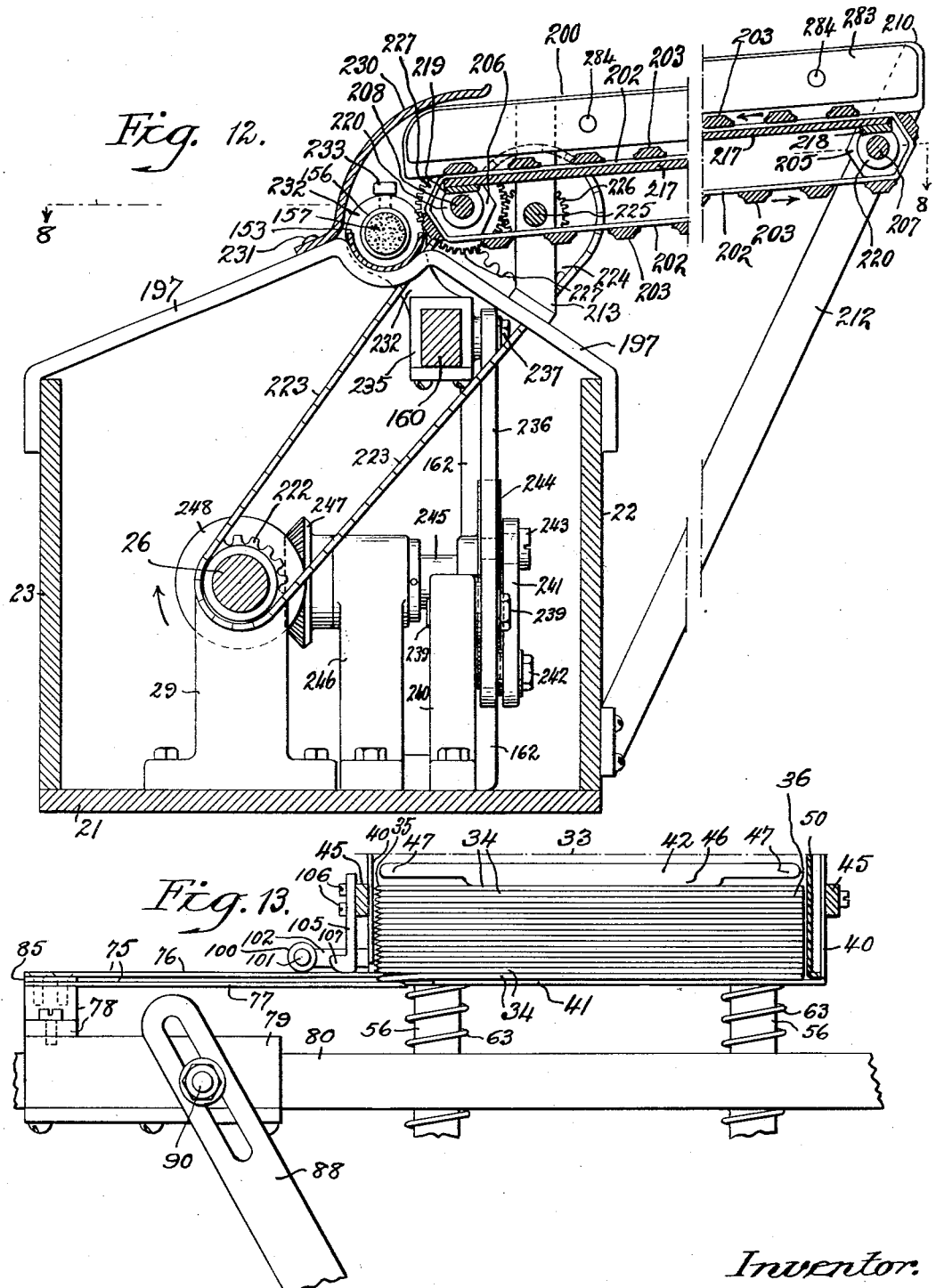

Patented Oct. 24, 1933

1,932,052

UNITED STATES PATENT OFFICE 1,932,052

MACHINE FOR INSERTING ARTICLES IN ENVELOPES

Leon J. Stocks, Philadelphia, Pa.

Application October 24, 1932. Serial No. 639,181

29 Claims. (Cl. 93—6)

My invention relates to a machine for inserting articles such as cigars, candy, tooth brushes, and various other articles, and particularly relates to a machine for inserting cigars in individual envelopes, formed of transparent material known under the trade name of cellophane.

The object of my invention is to provide an automatic machine in which the envelopes and articles are handled entirely by the machine and all hand operations are eliminated.

A further object is to provide mechanism for selecting one envelope from a magazine containing a stack of envelopes. Said envelopes are collapsible and are flat when stacked in the magazine.

A further object is to provide envelope selecting mechanism comprising a picker having upper and lower plates, said picker being movable endwise relatively to the length of the envelope, and arranged for receiving one envelope between said plates.

A further object is to provide mechanism for moving the picker, and also moving the magazine out of the path of the picker when the latter has selected one envelope.

A further object is to provide a receiver into which the envelope is inserted after it is removed from the magazine.

A further object is to provide means, in the form of rotating rollers for advancing the envelope from the picker into the receiver.

A further object is to provide means for centering the envelope within the receiver.

A further object is to construct a receiver of tubular shape having open ends, and divided longitudinally into a body and a lid, hinged together, and providing means for holding the lid closed upon the body and also for opening the lid for discharging the article from the receiver.

A further object is to provide a hopper located in longitudinal alignment with the receiver.

A further object is to provide an endless conveyor for feeding articles successively into the hopper.

A further object is to provide pneumatic means for partially opening the envelope.

A further object is to provide distending mechanism for distending the envelope for the insertion of the article, and also provide mechanism for moving the distending mechanism into operative position with the envelope.

A further object is to provide means for moving the article endwise, from the hopper, through said distending mechanism and into the envelope.

A further object is to provide crimping and folding mechanism for closing the end of the envelope after the article has been inserted.

A further object is to provide a pivoted arm for carrying the receiver and also providing mechanism for swinging the arm relatively to the envelope crimping and folding mechanism.

A further object is to provide means for adjusting the magazine to accommodate envelopes of different sizes.

A further object is to provide a receiver which is detachably mounted upon the arm, so that receivers of different sizes may be used to accommodate articles of different sizes.

These together with various other novel features of construction, and operation, which will be more fully hereinafter described and claimed, constitute my invention.

Referring to the accompanying drawings, Figure 1 is a plan view of my novel machine. Figure 2 is a side elevation of the machine shown in Figure 1. Figure 3 is a transverse vertical section on line 3—3, Figure 2 drawn on a larger scale.

Figure 4 is a partial, vertical, longitudinal section on line 4—4 Figure 3, showing the magazine raised and the picker fully advanced.

Figure 5 is a partial view similar to Figure 4, showing the envelope opener and distender moved toward the end of the envelope.

Figure 6 is a transverse, vertical section on line 6—6 Figures 1, 2, 4 and 8.

Figure 7 is a transverse, vertical section on line 7—7 Figures 1, 2, 4 and 8.

Figure 9 is a transverse vertical section on line 9—9 Figure 8.

Figure 10 is a vertical, longitudinal section on line 10—10 Figures 6, 7, 8 and 9.

Figure 11 is a view similar to Figure 10, showing the receiver and the push rod fully advanced toward the receiver.

Figure 12 is a transverse vertical section on line 12—12 Figures 1, 2 and 8.

Figure 13 is a partial longitudinal, vertical section similar to Figure 4, showing the picker partially advanced into engaging position with an envelope.

Figure 14:
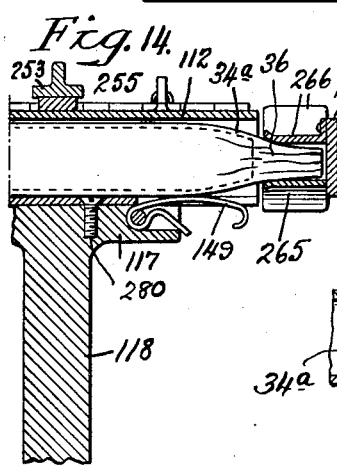
Figure 14 is a longitudinal section on line 14—14 Figure 7, showing the receiver as if moved transversely into a radical position indicated by the line 14—14.
Figure 15:
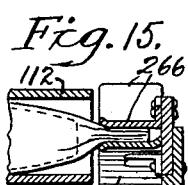

Figures 15 to 19, inclusive, are partial views similar to Figure 14, showing sections of the folding plates and rollers, as on the respective radial lines 15 to 19 Figure 7.

In the drawings, in which like reference characters refer to like parts, 20 represents a casing comprising a base 21, front and back walls 22 and 23 and end walls 24 and 25.

A main shaft 26 is rotatably mounted upon bearings 28 and 29 secured upon the base 21. A belt wheel 30 is secured upon said shaft and is rotated continuously by means of a belt 31 from any suitable source of power, not shown in the drawings.

A magazine 33 is provided for holding a stack of envelopes 34. The envelopes are placed in the magazine in the flat or collapsed form. The envelopes 34, are placed in the magazine with their closed ends 35 and their open ends 36 arranged as shown in Figures 4 and 13.

Figure 3:
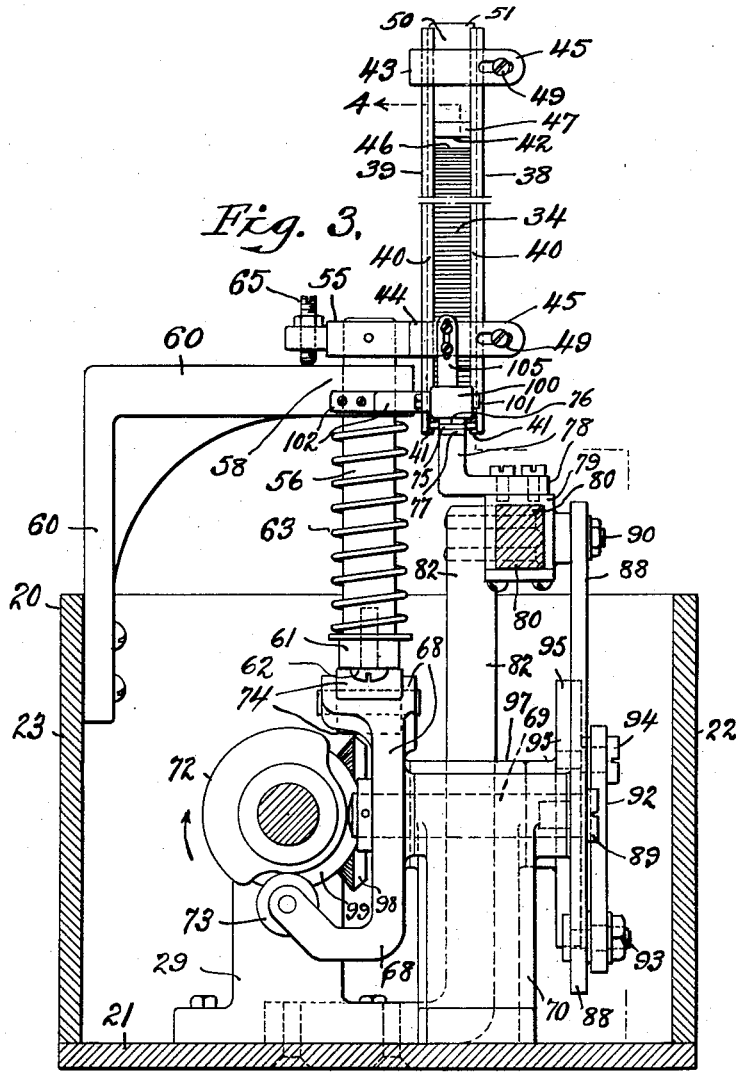

The magazine 33 consists of front and back walls 38 and 39 having their side and bottom edges bent to form inwardly projecting flanges 40 and 41, for retaining the envelopes. The walls 38 and 39 are arranged in spaced relation forming a box with an open top for the insertion of the envelopes. The end flanges 40 form vertical guides for the ends of the envelopes and the bottom flanges 41 form supports for the stack of envelopes. The bottom flanges 41 are located in spaced relation to each other, so that the envelope at the bottom of the stack may be slightly flexed downwardly into cylindrical formation and removed from the bottom flanges 41 of the magazine. A weight 42 is provided for moving the envelopes downwardly within the magazine, shown in Figures 3, 4 and 13.

The rear wall 39 of the magazine is secured to a bracket plate 43 and 44, having end members 45. The front wall 38 is secured to angle plates 48, which are adjustably secured to the members 45 by bolts 49, whereby the front and back walls may be adjusted for envelopes of different widths. A vertical end filling plate 50 is removably mounted within the magazine and forms an end guide for use when short envelopes are used. The filling plate 50 is provided, with a hook 51 which is supported upon the upper edges of the magazine.

The weight 42 is of novel construction, having a central bearing portion 46 which rests upon the center of the stack of envelopes, and leaves the ends of the envelopes free and uncompressed whereby the picker plates will more readily enter between the envelopes. The weight 42 is provided with elevated end members 47 which are of sufficient length, relatively to the length of the magazine, to insure the bearing portion 46 always being located near the center of the length of the envelopes.

The magazine 33 is supported by means of the lower bracket plate 44 secured to the back wall 39 of the magazine. Said plate 44 is provided with bosses 55 which embrace the upper ends of vertical rods 56 to which latter the bosses 55 are rigidly secured. The rods 56 are slidably mounted in bearings 58 formed upon the angle bracket 60, which latter in turn is secured to the back wall 23 of the casing. A cross bar 61 is secured upon the lower ends of the rods 56 by screws 62. Springs 63 are positioned upon the rods between the bearings 58 and said bar 61, thus tending to move the magazine downward.

Stop screws 65 are adjustably secured on the bosses 55 and take against the bearing bracket 60 for limiting the downward movement of the magazine.

The magazine is lifted during the removal of an envelope by means of a lever 68 secured upon a shaft 69, rotatably mounted upon a bearing 70, secured on the base 21. A cam 72, secured on the main shaft 26 engages a roller 73 rotatably mounted upon one arm of the lever 68. A roller 74 is rotatably mounted upon the opposite arm of the lever 68 and engages the cross bar 61 and lifts the magazine by the action of the cam 72.

The bottom one of the envelopes 34 is removed from the magazine by means of a picker 75, comprising upper and lower picker plates or fingers 76 and 77. The lower plate 77 is longer and extends under the envelope, as shown in Figure 13. The picker is advanced toward the magazine 33 and enters the space between the flanges formed upon the front and back walls of the magazine.

The picker plates are movable horizontally in alignment with the length of the bottom envelope within the magazine. The picker plates 76 and 77 are secured at one end thereof upon a bearing or bracket 78, which is secured upon a head 79 slidably mounted upon a guide bar 80 supported upon posts 81 and 82, secured upon the base 21.

The picker plates are separated by a spacing plate 85, through which the screws 86 pass for securing the picker plate to the bracket 78. Said spacing plate 85 may be dispensed with by placing a slight curve in each picker plate to insure the free ends of the picker plates passing above and below the bottom envelope within the magazine, when the head 79 carrying the picker plates is reciprocated.

When the picker has advanced about one-half the length of the magazine, the latter is lifted by the lever 68, and the bottom envelope is held between the picker plates, which latter hold the envelope from lifting with the magazine. The envelope will bend sufficiently to allow the picker plates to withdraw the longitudinal edges of the envelope from the horizontal supporting flanges 41, of the side walls of the magazine, as the latter is lifted.

The head 79, on which the picker is mounted, is reciprocated by a lever 88 which is loosely mounted on a screw 89 secured in the end of the shaft 69, which latter is mounted upon the bearing 70. The lever 88 is pivotally connected at one end with a stud shaft 90, formed upon the head 79. The opposite end of the lever 88 is pivotally connected with a connecting rod 92 by means of a bolt 93 adjustably secured on the lever 88. Said connecting rod is pivotally connected with a crank pin 94 on a disk 95. Said disk is secured upon a shaft 96, rotatably mounted in a bearing 97, secured on the base 21. The shaft 96 is rotated by a gear wheel 98 which is secured upon the shaft 96, and meshes with a gear wheel 99, secured on the main shaft 26.

A roller 100 is located above the picker plates 76 and 77 for holding them down when the magazine is lifted, thus preventing the picker plates from bending upwardly when the magazine moves upwardly. The roller adds rigidity to the picker plates so that they will hold the bottom envelope and withdraw it from the magazine when the latter moves upwardly. The roller 100 is rotatably mounted on a shaft 101, carried by a bracket plate 102, secured to the angle bracket 60.

A stop plate 105 is adjustably secured by screws 106, upon the end member 45, of the bracket plate 44 which carries the magazine 33. The lower end of the plate 105 forms a shoe 107 which rests upon the free end of the upper picker plate 76 when the magazine is in the down position, as shown in Figure 2. By adjusting the stop plate 105 vertically, relatively to the magazine, the top picker plate will be guided by the shoe 107 so that it will enter the space between the bottom envelope and the next above envelope. The picker plates embrace the bottom envelope between them as they move to the right, when about half of the length of an envelope is between the picker plates, the magazine is lifted and the envelope is held between the picker plates and withdrawn from the bottom of the magazine.

The picker plates continue to move to the right and carry the envelope toward the feed rollers 109 and 110 as the magazine 33 is held in the elevated position as shown in Figure 4.

A receiver 112, consists of a tube for receiving the envelope from the rollers 109 and 110, which rollers withdraw the envelope from the picker plates and advance the envelope into the receiver. Said tube is divided longitudinally, forming a body 113 and a lid 114, hinged together by a hinge 115. The body 113 is secured upon a bar 117 forming part of an arm 118, having a head 119 formed upon its lower end. Said head is rotatably mounted upon a shaft 120 mounted in a bearing 121 secured upon the base 21. The shaft 120 extends parallel with the main shaft 26 and also parallel with the length of the magazine 33 and the receiver 112, whereby the arm 118 may swing transversely relatively to the main shaft.

A stop screw 122, (see Figures 6, 7 and 8) is adjustably mounted in a clamp head 123, secured in a bearing bar 124, which latter is secured in a bearing plate 125 attached to the back wall of the casing. Said stop screw 122 is provided for limiting the movement of the arm 118 and provides adjusting means for locating the receiver 112 in longitudinal alignment with the magazine 33. A spring 127 attached to the arm 118 and to the back wall 23, normally holds the arm 118 in the position shown in Figures 1, 2, 4, 6 and 8.

The rollers 109 and 110 are located at the end of the receiver which is adjacent to the magazine and said rollers are provided for advancing the envelope from the picker plates into the receiver 112. The rollers 109 and 110 are located immediately adjacent to the end of the receiver 112, as shown in Fig. 4, and form an abutment for the closed end of the envelope for preventing the envelope from receding, or moving to the left, (Fig. 4), when the envelope is being opened and also when an article is being inserted into the open end of the envelope. Said rollers are preferably formed of rubber and are secured on horizontal shafts 130 and 131, (see Figures 4, 6 and 8). Said shafts are rotatably mounted in side bearing plates 132 secured upon a base block 133, which is detachably secured by screws to the end of the top bar 117 of the arm 118, whereby rollers of different sizes may be readily substituted to accommodate envelopes of different sizes.

The shafts 130 and 131, carrying the rollers, have secured thereon gear wheels 134 and 135 which are in mesh, as shown in Figure 6. A belt wheel 136 is secured upon the shaft 130 and is rotated by a belt 137 from a belt wheel 138, secured on a shaft 139, rotatably mounted in a bearing 140 carried upon a bar 141, forming part of the arm 118.

Figure 8:
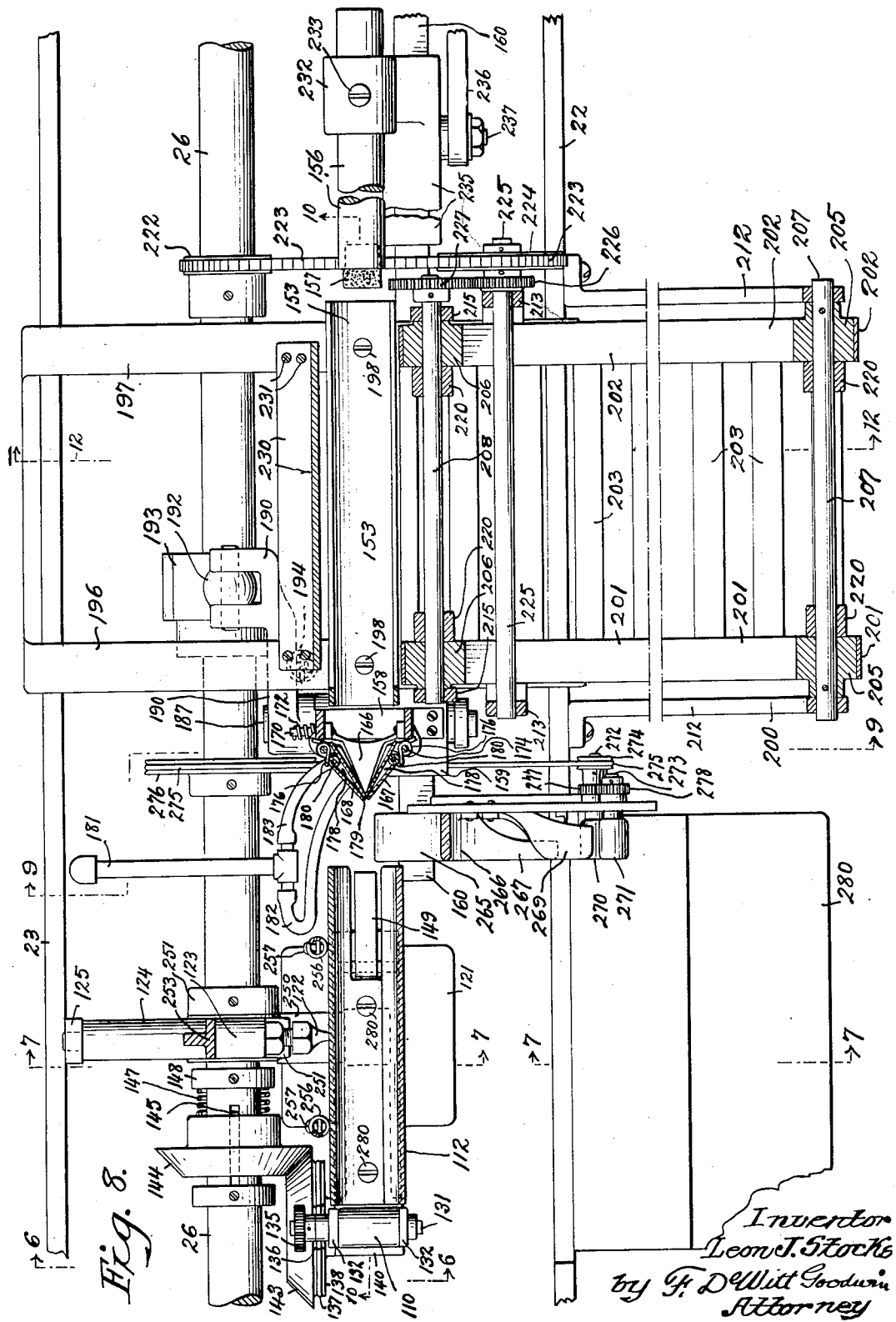
Figure 8 is a horizontal section on line 8—8 Figures 7, 9 and 12, showing the push rod withdrawn.

A bevel friction wheel 143 is secured on the shaft 139 and is in frictional engagement with a bevel friction wheel 144, secured upon the main shaft 26, by a key 145, shown in Figure 8. The key 145 permits the wheel 144 to slide longitudinally upon the main shaft 26. A spring 147 embraces the main shaft and is compressed between the wheel 144 and a collar 148, secured upon the main shaft 26. When the friction wheel 143, which is carried by the arm 118, is held in contact with the wheel 144, the latter will move longitudinally upon the main shaft, against the action of the spring 147, and thus rotate the wheel 143, due to frictional contact with the wheel 144. By thus yieldingly mounting the wheel 144 upon the main shaft, the arm 118 may be adjusted to various positions by the stop screw 122. The spring 127 holds the arm 118 in the adjusted vertical position against said stop screw 122, and when the arm 118 is in the vertical position shown in Figures 1, 2, 6 and 8, the main shaft 26 will rotate the wheels 143 and 144 and the rollers 109 and 110.

The envelope 34a is passed entirely into the receiver 112, by the rollers 109 and 110, into the position shown in Figure 4. A small plate spring 149 is mounted on a pin 150, secured in the bar 117 of the arm 118. Said spring 149 enters the body 113 of the receiver through a longitudinal slot 151 formed in the body and supports the forward end of the envelope upon the center line of the receiver tube, as the envelope is advanced by the rollers 109 and 110.

A hopper 153 in the form of a cylindrical tube, with the upper half open to receive an article, is mounted in longitudinal alignment with the receiver 112. Between the hopper 153 and the receiver 112 is located an envelope opener and distender 155. A push rod 156 is also mounted in alignment with the hopper 153 and the receiver 112.

The push rod is provided with a tip 157 made of soft rubber. Said rod is reciprocated for advancing the article from the hopper 153 through the envelope distender 155 and into the open end of the envelope within the receiver 112, as will be more fully hereinafter described.

The push rod 156 and the picker plates 75 and 76 are reciprocated in unison. In Figures 1 and 2 the picker 75 is shown at the start of its movement toward the receiver and the plates 76 and 77 are about to pick an envelope from the magazine, the push rod, therefore, is shown in Figures 1 and 2 at the completion of its movement toward the receiver 112 and is still located within the hopper and its end still located adjacent to the receiver. As the picker plates move to the right for advancing an envelope into the receiver, the push rod also moves to the right and withdraws from the hopper, as shown in Figure 8, so that an article can enter the hopper.

The envelope distender 155 comprises a bracket 158, secured upon a head 159, which is slidably mounted upon a guide bar 160 extending parallel with the main shaft. Said bar is supported upon vertical posts 161 and 162 secured upon the base 21. The bracket 158 has two vertical bearing plates 164 forming bearings for four segmental plates 165, 166, 167 and 168, which form a cone when closed, as shown in Figures 4, 5, and 8. Said plates are shown held in the open position in Figures 1 and 2, by the push rod 156, which is about to be moved to the right and withdrawn from the segmental plates, allowing them to close into conical formation.

The upper and lower plates 165 and 166 of the distender 155 are secured upon horizontal shafts 170 rotatably mounted upon the side bearing plates 164. Coil springs 172 are secured to the shafts 170 and engage the bearing plates 164 and tend to move the segmental plates 165 and 166 into the closed position, as shown in Figure 9. The side segmental plates 167 and 168 are pivoted upon vertical shafts 174, mounted in bearings 175, formed upon the side bearing plates 164. Coil springs 176 embrace the shafts 174 and engage the segmental plates 167 and 168 and tend to move said plates into the closed position. Said springs 172 and 176 are sufficiently delicate to allow the segmental plates to be opened by the end of a cigar 177 as it is moved from the hopper 153 by the push rod 156 toward the receiver 112, as shown in Figure 10.

The segmental plates 165 to 168 when closed form a sharp pointed cone, adapted to enter and open the end of the envelope, as shown in Figures 5 and 10.

The side segmental plates 167 and 168 are provided with double walls, as shown in Figure 8, which form an air chamber 178 on each side plate 167 and 168. A small aperture 179 is formed between said double walls at the points of the side plates 167 and 168, which form the apex of the cone. A small air tube 180 as attached to each of the plates 167 and 168, as shown in Figures 4, 8 and 9 for supplying air under pressure to the chambers 178 formed within the plates 167 and 168. Air is ejected from the apertures 179 formed at the points of the plates 167 and 168 toward the end of the envelope for partially opening the latter as shown in Figure 4. An air supply pipe 181 is connected with any suitable means for supplying air under pressure. The supply pipe 181 is connected with the air tubes 180 by flexible tubes 182 and 183.

The envelope opener comprising the air ejecting means and the distender 155 is moved toward the end of the envelope from the position shown in Figures 1, 2 and 4 to the position shown in Figure 5 by a sliding movement imparted to the head 159. An arm 185 is pivotally connected with the head 159 by means of a pin 186 secured upon said head. The arm 185 is secured upon a shaft 187 rotatably mounted upon a bearing 188 carried by a plate 189, secured to the guide bar 160. A cam arm 190 is also secured to the shaft 187, and carries a roller 192 which is engaged by a cam 193 secured upon the main shaft 26. A spring 194 is provided between the cam arm 190 and the base 21, which spring tends to return the arms 185 and 190 and the head 159, and the envelope opener and distender, into the position shown in Figures 1, 2, 4 and 8.

The cam 193 is timed so that the head 159 and segmental plates 165 to 168 forming the distender 155 will be moved into engaging position with the envelope, as shown in Figures 5 and 10, as soon as the envelope is moved completely into the receiver 112 by the feed rollers 109 and 110. The apex of the cone formed by the segmental plates enters and opens the end of the envelope, as shown in Figure 5. The air under pressure is directed continuously from the side segmental plates 167 and 168 toward the envelope and opens the end of the latter and thereby insures the entrance of the cone formed by the segmental plates entering the end of the envelope.

The segmental plates 165 to 168 are held in the position shown in Figure 5 by the cam 193 until a cigar, or other article is passed, by the push rod 156, from the hopper 153 against the segmental plates, thus opening said plates as shown in Figure 10. The envelope is thus distended by the opening movement of the segmental plates and by the injection of air under pressure so that the article may be passed by the push rod fully into the envelope, as shown in Figure 11. The head 159, carrying the segmental plates, returns to its normal position about the time the article has fully entered the receiver 112, but the segmental plates still rest upon, and are held open by the push rod 156 until said rod is withdrawn, as shown in Figures 1 and 2.

The hopper 153 comprises a tube supported on brace plates 196 and 197, secured to the front and back walls 22 and 23 of the casing. The tube is secured to the plates 196 and 197 by screws 198 and said tube is open at the top to receive the cigars, or articles from a conveyor 200.

The conveyor 200 comprises two narrow belts 201 and 202 which are connected by cleats 203. Said cleats have their ends secured to the belts, in any suitable manner.

The conveyor belts are mounted upon hexagon rollers 205 and 206, shown in Figures 8, 9 and 12. Said rollers are secured to shafts 207 and 208. Side plates 209 and 210 are located along the opposite sides of the belts and are supported by braces 212 and 213 attached to the side plates 209 and 210. The braces 212 are attached to the front wall 22 of the casing. The braces 213 are attached to the brace plates 196 and 197. The braces 212 form bearings for the shaft 207. The shaft 208, as shown in Figure 9, is mounted in bearings 215, depending from the side plates 209 and 210. A belt supporting plate 217 is secured upon and supported by plates 218 and 219, having bearing lugs 220 loosely mounted upon the shafts 207 and 208.

The shaft 208 is rotated by the main shaft 26 on which latter is secured a sprocket wheel 222. A sprocket chain 223 on the wheel 222 imparts motion to a sprocket wheel 224, secured on a counter shaft 225 rotatably mounted in the braces 213. A gear wheel 226 is secured on the counter shaft 225 and meshes with a gear wheel 227 secured on the shaft 208 and imparts motion to the conveyor belts at a reduced speed relatively to the main shaft.

The cigars or other articles are placed between the cleats 203 of the conveyor, and as the latter is advanced the articles are dropped into the hopper 153.

A guard plate 230 is provided for directing the articles into the hopper. Said guard plate is secured upon the brace plates 196 and 197 by fastening devices 231.

The push rod 156 is secured in a bracket 232 by means of a set screw 233 by which the rod may be adjusted longitudinally. The bracket 232 is mounted upon a head 235 which is slidably mounted upon the guide bar 160. The head 235 is reciprocated by a lever 236, having one end pivotally connected with the head 235, by a stud shaft 237, formed upon said head.

The lever 236 is mounted upon a pivot shaft 239, rotatably mounted in a bearing 240 secured upon the base 21. A connecting rod 241 is pivotally connected with the opposite end of the lever by a pivot pin 242, and the opposite end of the connecting rod is connected with a crank pin 243, secured upon a disk 244. The disk 244 is secured upon a shaft 245 rotatably mounted in a bearing 246 secured upon the base 21. A bevel gear 247 is secured upon the shaft 245 and meshes with a bevel gear 248 secured upon the main shaft 26, for imparting reciprocatory motion to the push rod 156.

The body 113 of the receiver 112 is mounted upon the arm 118 above described. After the article has been passed into the envelope located within the receiver and the push rod has moved to the right sufficiently to be withdrawn from the envelope and the receiver, the arm 118 is swung transversely relatively to the main shaft, from the position shown in full lines to the position shown in dot and dash lines Figure 7, for discharging the article from the receiver.

The arm 118 is provided with a cam plate 250, which is engaged by a cam 251, secured upon the main shaft 26. The cam swings the arm against the action of the spring 127, which normally holds the arm in the vertical position against the stop 122.

The lid 114 of the receiver 112 is held closed by a cam bar 253 secured upon the bearing bar 124, by the clamp head 123. The lid 114 is provided with a cam 255 which slides along the under cam face of the bar 253 which holds the lid closed against the action of the springs 256, attached to screws 257 on the bar 117 of the arm 118, and to arms 258, secured upon the lid 114. When the arm 118 swings into the position shown in dot and dash lines Figure 7, the curved section 260 of the cam bar 253 allows the lid 114 to open upon the hinge 115 by the action of the springs 256.

The end 36 of the envelope 34a is closed after the article is inserted therein and the end of the envelope is folded upon itself and pressed tightly together during the transverse movement of the arm 118 by the mechanism shown in Figures 1, 2, 7, 8, 14 to 19.

A bracket 262 is secured upon the front plate 22 of the casing. A vertical plate 263 is rigidly secured to said bracket and carries plates 265 and 266 which are inclined outwardly towards the end of the receiver when the latter is in the vertical position. The plates 265 and 266 are arranged to receive the open end of the envelope and flatten the end as the envelope is carried by the transverse movement of the arm 118 into the contracted throat formed between the plates 265 and 266. The upper plate 266 is reduced in width forming a narrow portion 267 shown in Figures 1, 16 and 17.

Figure 16:
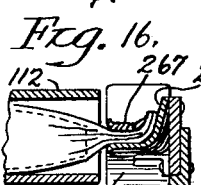
Figure 17:
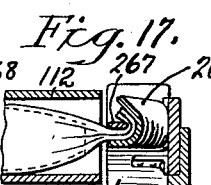

The lower plate 265 forms a support for the end of the envelope and said lower plate has an upwardly curved portion 268 arranged for bending the end of the envelope upwardly around the narrow portion 267 of the upper plate as shown in Figures 16 to 17.

Figures 18, 19:
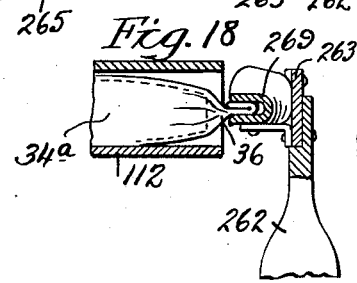

The lower plate 265 is further bent into a U-shape portion 269, as shown in Figure 18.

Rollers 270 and 271 are located to receive the folded end of the envelope between them as the envelope is further carried by the swinging movement of the arm 118. The rollers 270 and 271 are secured upon shafts 272 and 273 rotatably mounted in bearings formed upon the bracket 262, as shown in Figure 19. A belt wheel 274 is secured upon the shaft 272 and is rotated by a belt 275, driven by a belt wheel 276 secured upon the main shaft 26. Gear wheels 277 and 278 are secured upon the shafts 272 and 273 for rotating the rollers 270 and 271 in unison for tightly pressing the folded end of the envelope between said rollers as shown in Figure 19.

A delivery plate 280 is secured upon the front wall 22 of the casing by fastening devices 281, as shown in Figure 7. The plate 280 is located adjacent to the arm 118, when the latter is in the position shown in dot and dash lines Figure 7, and said plate is arranged to have the article deposited thereon when the article is released from the receiver 112 by the opening of the lid 114. The inclined position of the arm 118 causes the article to roll from the receiver body 113 onto the delivery plate 280. The plate spring 149 located within the receiver assists in the discharging of the article from the receiver when the latter is opened.

The receiver body 113 is detachably secured to the top bar 117 of the arm 118 by screws 280, whereby receivers of different sizes may be substituted to accommodate articles of different sizes.

The conveyor 200 is provided with an adjustable side guide plate 283 which is mounted on horizontal stud shafts 284 which are slidably mounted upon bearings 285 formed upon the side plates 209 and 210 of the conveyor. Set screws 286 upon the bearings 285 provide means for adjustably securing the guide plate 283 in different positions to accommodate articles of different lengths as they are advanced by the conveyor.

The operation of my invention is as follows:— The envelopes are placed in the magazine and the weight 42 depresses the central portion of the envelopes leaving the ends free. The picker 75 is advanced by the operation of the main shaft 26 and the operation of the lever 88. The picker plates 76 and 77 enter the magazine and embrace the bottom envelope between them. When the picker is moved to a position in which the free ends of the picker plates are about in the center of the length of the magazine, the latter is raised by the lever 68, operated by the cam 72. The envelope is held between the picker plates and is thus flexed into slightly cylindrical form by the upward movement of the magazine, so that the longitudinal edges of the envelope will be released from the longitudinal bottom flanges 41 of the magazine. During the advancing of the picker the push rod 156 is moving to the right and withdrawing from the receiver 112 and the hopper 153.

The envelope is carried by the picker plates between the feed rollers 109 and 110, which are rotated by the main shaft. The rollers withdraw the envelope from the picker and deliver the envelope within the receiver 112, as shown in Figure 4. The open end 36 of the envelope projects from the receiver and is presented adjacent to the points of the segmental plates 167 and 168 through which air under pressure is injected into the envelope and opens the latter.

The segmental plates of the envelope distender are now moved by the arm 185 and the cam 193 from the position shown in Figure 4 to the position shown in Figure 5 and partially enter the envelope.

The rollers 109 and 110 are positioned adjacent to the end of the receiver and form an abutment for the closed end of the envelope, as shown in Fig. 4.

The articles to be inserted in the envelopes are placed between the cleats of the conveyor and are successively deposited in the hopper 153 as the conveyor belt is advanced. The push rod is moved to the left by the lever 236 and the tip 157 of the push rod engages and slides the article longitudinally through the hopper and through the distender as shown in Figure 10. The article engages and opens the segmental plates of the distender, against the action of the small springs which tend to close the segmental plates into conical formation.

The opening of the segmental plates, by the advancing of the article, causes the points of said plates to fully open the envelope for the free entrance of the article into the envelope.

The push rod passes between the segmental plates and pushes the article fully into the envelope as shown in Figure 11. The push rod then moves to the right and withdraws from the envelope and the receiver. The distender is moved back from the receiver by the spring 194, from the position shown in Figure 5 to that shown in Figure 4, and the push rod withdraws from the distender and allows the segmental plates to close into conical formation.

The arm 118 is moved transversely relatively to the main shaft and carries the envelope with the article therein. The open end of the envelope is advanced between the plates 265 and 266, which plates close the end of the envelope. The curved portion 268, of the plate 265, turns the end of the closed envelope into the position shown in Figure 18, and as the arm 118 further swings, it carries the folded end of the envelope between the rollers 270 and 271, as shown in Figure 19.

When the arm 118 swings adjacent to the position shown in dot and dash lines Figure 7, the cam 255 on the lid 114 of the receiver is released by the curved portion 260 thus allowing the springs 256 to open the lid and discharge the article enclosed within the envelope upon the inclined delivery plate 280.

Various changes in the construction and operation of the various parts may be made without departing from my invention.

I claim:—

1. A machine of the character described having in combination, a receiver of tubular formation having open ends, mechanism arranged for advancing a collapsed envelope into one end of the receiver, means located within the receiver for supporting the envelope adjacent to the longitudinal axis of the receiver, mechanism located adjacent to the opposite end of the receiver for distending the envelope, and mechanism for advancing an article into the envelope.

2. A machine of the character described having in combination, a receiver of tubular formation having open ends, rollers located at one end of the receiver, means for rotating the rollers for advancing an envelope into the receiver, a plate spring located within the receiver adjacent to the end opposite to the rollers and arranged for supporting the envelope adjacent to the longitudinal center of the receiver, and mechanism located in longitudinal alignment with the receiver for advancing an article into the envelope located within the receiver.

3. A machine of the character described having in combination, a magazine for holding a stack of envelopes, a receiver of tubular formation arranged to receive an envelope, feed rollers for feeding the envelope from the magazine to the receiver, means for engaging one envelope of the stack and advancing it toward the rollers, means for distending the envelope, mechanism for advancing an article into the envelope within the receiver, and means positioning the rollers immediately adjacent to the end of the receiver whereby the rollers form an abutment for holding the envelope from receding as the article is advanced into the envelope.

4. A machine of the character described having in combination, a cylindrical receiver having open ends, feed rollers arranged for advancing an envelope into the receiver, an envelope distending means including segmental plates, located in alignment with the receiver and engageable with the envelope for distending the latter, a bracket upon which said segmental plates are mounted, means for advancing an article into the envelope within the receiver, and means positioning the rollers immediately adjacent to the end of the receiver whereby the rollers form an abutment for holding the envelope from receding as the article is advanced into the envelope.

5. A machine of the character described having in combination, a receiver having open ends, feed rollers arranged for advancing a collapsed enevelope into the receiver, segmental plates, a bracket upon which said plates are pivotally mounted, said plates forming a cone with its apex located in alignment with the longitudinal axis of the receiver, means for advancing an article between said plates, said plates located in engaging position with the envelope for distending the latter in advance of the entrance of the article into the envelope, and means positioning the rollers immediately adjacent to the end of the receiver whereby the rollers form an abutment for holding the envelope from receding as the article is advanced into the envelope.

6. A machine of the character described having in combination, a cylindrical receiver having open ends, feed rollers arranged for advancing a collapsed envelope into the receiver, segmental plates, a bracket upon which said plates are pivotally mounted, said plates forming a cone with its apex located in alignment with the longitudinal axis of the receiver, springs upon said bracket arranged for closing said plates into conical formation, means for advancing an article against the plates for opening the latter against the action of said springs and for engaging the plates with the envelope for distending the latter in advance of the entrance of the article into the envelope, and means positioning the rollers immediately adjacent to the end of the receiver whereby the rollers form an abutment for holding the envelope from receding as the article is advanced into the envelope.

7. A machine of the character described having in combination, a cylindrical receiver having open ends, feed rollers arranged for advancing a collapsed envelope into the receiver, segmental plates, a bracket upon which said plates are pivotally mounted, said plates forming a cone with its apex located in alignment with the longitudinal axis of the receiver, segmental plates, a bracket located in alignment with the longitudinal axis of the receiver, a shaft associated with each plate, bearings upon said bracket upon which bearings the shafts are mounted, a spring associated with each plate and with the bracket arranged for closing said plates into conical formation with the apex presented to the open end of the envelope, means for advancing an article against the plates for opening the latter and distending the envelope by the opening of said plates, and means positioning the rollers immediately adjacent to the end of the receiver whereby the rollers form an abutment for holding the envelope from receding as the article is advanced into the envelope.

8. A machine of the character described having in combination, a cylindrical receiver having open ends, feed rollers arranged for advancing a collapsed envelope into the receiver, segmental plates, a bracket upon which said plates are pivotally mounted, said plates forming a cone with its apex located in alignment with the longitudinal axis of the receiver, a guide bar, a head slidably mounted upon the guide bar, means mounting said bracket upon said head, mechanism for moving the head toward the receiver whereby the apex of the plates will enter the envelope, means for advancing an article between said plates for further opening the envelope to receive the article, and means positioning the rollers immediately adjacent to the end of the receiver whereby the rollers form an abutment for holding the envelope from receding as the article is advanced into the envelope.

9. The combination of, a base, a receiver mounted upon the base, mechanism for advancing an envelope into the receiver, a bracket located adjacent to the receiver, segmental plates pivotally mounted upon the bracket, said plates forming a cone with its apex located in alignment with the longitudinal axis of the receiver, a guide bar mounted upon said base, a head slidably mounted upon the guide bar, means mounting said bracket upon said head, a main shaft, bearings upon the base and in which bearings the main shaft is rotatably mounted, a cam upon the main shaft, an arm actuated by said cam, a shaft carrying said arm, a bearing upon which the last mentioned shaft is pivotally mounted, a second arm secured upon the last mentioned shaft, means operatively associating said head with said last mentioned arm for moving the head upon the guide bar, and a spring tending to oppose the movement of the head by said cam for returning the head to its normal position.

10. The combination of, a base, a magazine for holding a stack of envelopes, a cylindrical receiver having open ends and mounted upon said base, feed rollers for advancing an envelope from the magazine into the receiver, a hopper mounted upon the base in longitudinal alignment with the receiver, a push rod, means for reciprocating said rod for advancing an article from the hopper into the envelope located within the receiver, means located between the receiver and the hopper for opening the envelope, and means positioning the rollers immediately adjacent to the end of the receiver whereby the rollers form an abutment for holding the envelope from receding as the article is advanced into the envelope.

11. The combination of, a base, a magazine for holding a stack of envelopes, a cylindrical receiver having open ends and mounted upon said base, feed rollers for advancing an envelope from the magazine into the receiver, a hopper mounted upon the base, a bracket located between the receiver and the hopper, a nozzle mounted upon said bracket having its outlet directed toward the receiver, a pipe connected with said nozzle with a source of air pressure supply, and mechanism for advancing an article from the hopper into the envelope within the receiver, and means positioning the rollers immediately adjacent to the end of the receiver whereby the rollers form an abutment for holding the envelope from receding as the article is advanced into the envelope.

12. The combination of a receiver of tubular formation having open ends arranged to be occupied by an envelope, a hopper located in alignment with the longitudinal axis of the receiver, a bracket located between the receiver and the hopper, plates pivotally mounted upon the bracket and presented toward the receiver, one of said plates having double walls forming an air chamber with an outlet formed therein and located adjacent the receiver, a pipe connected with the plate forming said air chamber for supplying air under pressure to said chamber, and mechanism for advancing an article from the hopper into the envelope within the receiver.

13. The combination of a receiver, a hopper mounted in alignment with the receiver, feed rollers arranged for advancing an envelope into the receiver, a push rod arranged for advancing an article from the hopper into the envelope within the receiver, a bracket, means for adjustably securing the push rod in said bracket, a head upon which the bracket is mounted, means for reciprocating the head relatively to the hopper, and means positioning the rollers immediately adjacent to the end of the receiver whereby the rollers form an abutment for holding the envelope from receding as the article is advanced into the envelope.

14. The combination of a receiver, a hopper mounted in alignment with the receiver, a push rod arranged for advancing an article from the hopper into the receiver, a bracket, a base, a guide bar mounted upon the base, a head slidably mounted upon the bar, means for mounting the push rod upon said head, a main shaft rotatably mounted upon the base, a gear wheel secured upon said shaft, a second gear wheel meshing with the first mentioned gear wheel, a shaft rotatably mounted upon the base and having said second gear wheel secured thereto, a disk secured to the last mentioned shaft, a connecting rod operatively associated with the disk, a lever pivotally connected with the connecting rod, a bearing upon the base upon which the lever is pivotally mounted, and means operatively associating the lever with said head.

15. The combination of, a magazine for holding envelopes, a receiver, means for advancing an envelope from the magazine into the receiver, a hopper located adjacent to the receiver, means for advancing an article from the hopper into the envelope within the receiver, a base, an arm mounted upon the base, said arm arranged for supporting said receiver, and a fastening device for detachably securing the receiver upon the arm whereby receivers of different sizes may be readily substituted.

16. The combination of, a magazine, a hopper, a cylindrical receiver having open ends, said receiver located between the magazine and the hopper, said receiver comprising a body and a lid, means for hinging the lid upon the body and upon an axis extending parallel with the longitudinal axis of the receiver, an arm upon which the receiver body is mounted, a bearing in which the arm is movable transversely relatively to the length of the receiver, mechanism operatively associated with the lid for holding it closed upon the body when the receiver is in alignment with the magazine and the hopper, a spring operatively associated with the body and the lid tending to open the lid when the receiver is moved by the arm into article discharging position out of alignment with the magazine and the hopper, a main shaft, and mechanism operatively associated with the arm and the shaft arranged for moving the arm and the receiver transversely relatively to the magazine and the hopper.

17. The combination of, a base, a main shaft rotatably mounted upon the base, a magazine for holding envelopes, a hopper for holding an article to be inserted into an envelope, a receiver located between the magazine and the hopper, said receiver including a body and a lid, an arm upon which said body is mounted, a bearing upon the base in which the arm is mounted and rotatable upon an axis extending parallel with the longitudinal axis of the receiver, a cam bar secured at one end thereof to the base and arranged for holding said lid closed upon the body and for releasing the lid when the arm is moved out of alignment with the magazine and the hopper, a cam upon the main shaft, a part upon the arm engageable by the last mentioned cam, and a spring operatively associated with the arm tending to return the arm to a position in alignment with the hopper.

18. The combination of, a base, a main shaft rotatably mounted upon the base, a magazine for holding envelopes, a hopper for holding an article to be inserted into an envelope, a receiver located between the magazine and the hopper, an arm upon which the receiver is mounted, feed rollers rotatably mounted upon the arm and located adjacent to one end of the receiver for advancing an envelope into the receiver, a shaft upon said arm, means upon said last mentioned shaft for imparting rotary motion to said rollers, a friction wheel secured upon said last mentioned shaft, a friction wheel secured upon the main shaft, a bearing upon the base upon which the arm is rotatable transversely relatively to the main shaft, and a spring operatively associated with the base and the arm for holding the arm in a position to engage said friction wheels.

19. The combination of a base, a casing mounted upon the base, a main shaft rotatably mounted upon the base, an arm pivotally mounted upon the base, said arm rotatable upon an axis extending parallel with the main shaft, a receiver of tubular formation having its longitudinal axis positioned parallel with the main shaft, a hopper mounted upon the casing, a stop screw adjustably mounted upon the casing and engageable with the arm, a spring attached to said arm and the casing and tending to hold the arm against said stop, feed rollers rotatably mounted upon the arm and located adjacent to the end of the receiver, a shaft rotatably mounted upon said arm, means upon said last mentioned shaft for imparting rotary motion to said rollers, a friction wheel secured upon said last mentioned shaft, a friction wheel slidably mounted upon and rotatable with the main shaft, a collar secured upon the main shaft and a spring positioned between said collar and the friction wheel located upon the main shaft tending to yieldingly hold said friction wheels in driving engagement.

20. The combination of a base, an arm pivotally mounted upon the base, a receiver of tubular formation mounted upon said arm, means for advancing an envelope into the receiver, a hopper, means for advancing an article from the hopper into the envelope within the receiver, means for swinging the arm transversely relatively to the hopper, a bracket mounted upon the base, plates secured upon the bracket and located adjacent to the receiver and arranged for closing the end of the envelope as the arm is moved transversely, and one of said plates having a U-shaped portion embracing the other one of said plates arranged for folding the end of the envelope.

21. The combination of a base, an arm pivotally mounted upon the base, a receiver of tubular formation mounted upon said arm, means for advancing an envelope into the receiver, a hopper, means for advancing an article from the hopper into the envelope within the receiver, means for swinging the arm transversely relatively to the hopper, a bracket mounted upon the base, plates secured upon the bracket and located adjacent to the receiver and arranged for closing the end of the envelope as the arm is moved transversely, a pair of rollers mounted upon said bracket arranged to receive the closed end of the envelope between them, and means for rotating said rollers.

22. The combination of a base, a casing mounted upon the base, a main shaft rotatably mounted upon the base, a receiver mounted upon the base, a hopper mounted upon the base in longitudinal alignment with the receiver, a push rod for advancing an article from the hopper into the receiver, means actuated by the main shaft for reciprocating the push rod, a conveyor belt, shafts extending parallel with the length of the hopper, hexagonal rollers upon said last mentioned shafts, said conveyor belt mounted upon said rollers, cleats upon said belt between which articles are placed, and driving means operatively associated with the main shaft and with one of said shafts around which the belt passes for advancing the belt at a reduced speed relatively to the main shaft.

23. The combination of a base, a casing mounted upon the base, a main shaft rotatably mounted upon the base, a receiver mounted upon the base, a hopper mounted upon the base in longitudinal alignment with the receiver, a push rod for advancing an article from the hopper into the receiver, means actuated by the main shaft for reciprocating the push rod, a conveyor belt, shafts extending parallel with the length of the hopper upon which the belt is mounted, braces upon the casing, side plates mounted upon said braces located adjacent to the edges of the belt, bearings for said last mentioned shafts associated with said side plates, means operatively associated with the main shaft for rotating one of the shafts around which the belt passes, said side plates projecting above the top surface of the belt, a guide located in parallel relation with one of said side plates, and means adjustably mounting the guide plate in spaced relation with said side plates.

24. The combination of a base, a main shaft rotatably mounted upon bearings upon said base, a magazine for containing a stack of envelopes, picker plates movable relatively to the magazine for embracing an envelope between said plates, mechanism operatively associated with the main shaft and the magazine for lifting the magazine relatively to the picker plates, a receiver of tubular formation having open ends located in alignment with the picker plates, rollers positioned between the picker plates and the receiver, mechanism operatively associated with the main shaft for rotating the rollers for advancing the envelope into the receiver, a hopper located in longitudinal alignment with the receiver, a push rod movable longitudinally through said hopper for moving an article from the hopper into the envelope within the receiver, a guide bar mounted upon said base, a head slidably mounted upon said bar, mechanism operatively associated with the main shaft for reciprocating said head, segmental plates pivotally mounted upon said head and movable into engaging position with the envelope by the reciprocation of said head, said segmental plates positioned between said hopper and said receiver and arranged to be engaged by the article as advanced from the hopper for distending the envelope to receive the article, a pipe connected with a source of air under pressure, one of said segmental plates having an air passage formed through the same and connected with said pipe for directing a jet of air towards the envelope, and mechanism operatively associated with the main shaft and the receiver for moving the latter into article discharging position.

25. The combination of a base, a main shaft, bearings upon the base upon which the shaft is rotatably mounted, a magazine for containing envelopes, envelope engaging means arranged for withdrawing an envelope from the magazine, a receiver, mechanism operatively associated with the main shaft and said engaging means for reciprocating the latter for advancing an envelope from the magazine into said receiver, a hopper, a conveyor operatively associated with the main shaft for successively depositing articles into the hopper, an envelope distender located between the hopper and said receiver arranged for partially entering the envelope, a push rod, mechanism associated with the main shaft for reciprocating the push rod for moving said article from the hopper through said distender and into the envelope, mechanism operatively associated with the main shaft for moving the envelope distender to and from the receiver, mechanism operatively associated with the main shaft for moving said receiver transversely relatively to the main shaft, a bracket mounted upon the base, plates secured upon the bracket and located adjacent to the receiver and arranged for closing and folding the end of the envelope as the arm is moved transversely to the main shaft, rollers operatively associated with the main shaft for pressing the folded end of the envelope, and receiver opening means arranged for opening the receiver and for discharging the article from the receiver.

26. A machine of the character described having in combination, a receiver having open ends, mechanism arranged for advancing an envelope having open and closed ends into the receiver, envelope distending means, mechanism for advancing an article into the open end of the envelope, and said first mentioned mechanism positioned adjacent to the end of the receiver and arranged to form an abutment for the closed end of the envelope for holding the latter from receding as the article is advanced into the envelope.

27. A machine of the character described having in combination, a receiver having open ends, rollers located at one end of the receiver, means for rotating the rollers for advancing an envelope having open and closed ends into the receiver with the open end of the envelope in advance, mechanism located adjacent to the receiver for advancing an article into the open end of the envelope, and means for positioning the rollers adjacent to the opposite end of the receiver relatively to said mechanism whereby the rollers will form an abutment for the closed end of the envelope for holding the latter from receding as the article is advanced into the envelope.

28. A machine of the character described having in combination, a cylindrical receiver having open ends, means for inserting a collapsed envelope into the receiver, and means yieldingly mounted within the receiver for supporting the envelope adjacent to the longitudinal axis of the receiver.

29. A machine of the character described having in combination, a receiver of cylindrical formation having open ends, rollers located at one end of the receiver, means for rotating the rollers for advancing a collapsed envelope having open and closed ends into the receiver, means located within the receiver for supporting the envelope adjacent to the longitudinal axis of the receiver, mechanism located adjacent to the opposite end of the receiver for advancing an article into the open end of the envelope located within the receiver, said rollers forming an abutment for the closed end of the envelope as the article is advanced into the envelope.

LEON J. STOCKS.